United States Patent [19]

Fox et al.

[11] Patent Number: 4,595,729

[45] Date of Patent: Jun. 17, 1986

[54] POLYCARBONATE/ADDITION POLYMER BLENDS

[75] Inventors: Daniel W. Fox, Pittsfield; Edward N. Peters, Lenox; Gary F. Smith, Pittsfield, all of Mass.

[73] Assignee: General Electric Company, Pittsfield, Mass.

[21] Appl. No.: 692,773

[22] Filed: Jan. 18, 1985

Related U.S. Application Data

[60] Division of Ser. No. 451,181, Dec. 20, 1982, Pat. No. 4,511,693, which is a continuation-in-part of Ser. No. 259,524, May 1, 1981, abandoned.

[51] Int. Cl.[4] .............................................. C08L 69/00

[52] U.S. Cl. ...................................... 525/147; 525/67; 525/148; 525/468

[58] Field of Search .................. 525/67, 147, 148, 468

[56] References Cited

U.S. PATENT DOCUMENTS

| | | | |
|---|---|---|---|
| 4,005,037 | 1/1977 | Mietzsch et al. | 525/147 X |
| 4,045,514 | 8/1977 | Iwahashi et al. | 260/873 |
| 4,172,103 | 10/1979 | Serini et al. | 525/76 |
| 4,239,861 | 12/1980 | Braese et al. | 525/148 X |
| 4,260,693 | 4/1981 | Liu | 525/148 |
| 4,286,075 | 8/1981 | Robeson et al. | 525/68 |
| 4,324,869 | 4/1982 | Robeson | 525/68 |

*Primary Examiner*—Theodore E. Pertilla
*Attorney, Agent, or Firm*—Hedman, Gibson, Costigan & Hoare

[57] ABSTRACT

A thermoplastic composition includes compatible blends of a mixed polycarbonate comprising units derived from a first dihydric phenol, which is a bis(hydroxyaryl) sulfone, a second dihydric phenol; and one or more thermoplastic polymers containing hetero groups.

20 Claims, No Drawings

POLYCARBONATE/ADDITION POLYMER BLENDS

REFERENCE TO EARLIER FILED APPLICATION

This application is a divisional of application Ser. No. 451,181, filed Dec. 20, 1982, now U.S. Pat. No. 4,511,693, which in turn is a continuation-in-part of application Ser. No. 259,524, filed May 1, 1981, now abandoned.

This invention relates to thermoplastic compositions containing a mixed polycarbonate and thermoplastic addition polymer containing hetero groups which are admixed to provide compatible blends. More particularly, it relates to compositions comprising a mixed polycarbonate which comprises units derived from a first dihydric phenol which is a bis(hydroxyaryl)sulfone and a second dihydric phenol, and one or more thermoplastic polymers containing hetero groups to provide a compatible blend.

BACKGROUND OF THE INVENTION

At present, it is known to prepare a copolymer consisting of the reaction product of bis(3,5-dimethyl-4-hydroxyphenyl)sulfone; 2,2-bis(4-hydroxyphenyl)propane and a carbonate precursor. U.S. Pat. No. 3,737,409 describes a process for making such a copolymer, which is disclosed to lend itself to the preparation of textile fibers.

U.S. Pat. No. 4,286,075 describes a molding composition comprising blends of polyarylates derived from a dihydric phenol and mixtures of terephthalic acid and isophthalic acid, and at least one thermoplastic polymer compatible therewith. A blend of the polyarylates and an aromatic polycarbonate, where a thermoplastic compatible polymer is optionally added is also mentioned.

Polymer mixtures such as polycarbonates based on 2,2-bis(3,5-dimethyl-4-hydroxyphenyl)propane and ABS type addition polymers were disclosed to have better molding properties than mixtures where the polycarbonate was based upon 2,2-bis(4-hydroxyphenyl)-propane, in U.S. Pat. No. 4,172,103. Such blends however showed a decrease in the elastic modulus.

Broadly disclosed, but not claimed, also are mixtures comprising mixed polycarbonates and thermoplastic resins. However, no data on the physical properties of these such mixtures can be found in said patent.

When compositions suggested by the disclosure in U.S. Pat. No. 4,172,103 were proposed, as will be shown hereinafter, they were inferior in certain important physical properties. e.g., resistance to distortion by heat and mechanical properties such as stiffness and strength.

In applicant's concurrently filed copending application, Ser. No. 451,180 filed Dec. 20, 1982, now U.S. Pat. No. 4,510,289, there are disclosed and claimed novel compositions comprising mixed polycarbonates and thermoplastic condensation polymers, alone or in further combination with addition polymer containing hetero groups which are admixed to provide compatible compositions.

SUMMARY OF THE INVENTION

Compatible mixtures of polycarbonates and thermoplastic resins have generally not been produced over a broad range of component proportions.

It is an object of this invention to provide blends of polycarbonate and thermoplastic addition resins which are compatible in mixtures having widely varying ratios of components and which have improved properties.

When used herein and in the appended claims, "compatible" refers to blends or compositions of polymers in which the component polymers do not undergo phase separation, thus helping to avoid stratification of the components during or after processing. Compatibility is of great significance for an admixture of different resins, because it ensures homogeneity, and a unity of properties, which greatly facilitates subsequent processing and use of the composition. Incompatible blends separate into phases containing predominantly their own separate components, and thus may be considered to be immiscible. This characteristic, combined with the often low physical attraction forces across the phase bounderies, usually causes immiscible/incompatible blend systems to have poor mechanical properties, thus preventing the preparation of useful polymer blends.

When blends of two polymers exhibit a single glass transition temperature (Tg), it generally signifies the resin components are compatible. However, a single Tg is not a necessary condition for a compatible blend.

In accordance with the present invention, there are provided thermoplastic compositions comprising a polycarbonate resin and a thermoplastic addition polymer resin which have been melt admixed to provide a compatible composition.

Polycarbonates useful in accordance with the present invention are well known and any, especially the aromatic polycarbonates, may be employed. Intrinsic viscosities of from 0.40 to 0.80 dl./g (as measured in phenol/trichloroethylene) are preferred. Such resins may be formed from dihydric phenol, such as hydrocarbon bisphenol monomer, ordinarily by condensation with a carbonate precursor such as carbonyl chloride to provide a linear polymer consisting of units of the dihydric phenol linked to one another through carbonate linkages. The polycarbonate of the invention includes units derived from a dihydric phenol and a dihydric aryl sulfone.

In an especially preferred embodiment, a polycarbonate copolymer includes a diphenyl sulfone as described in U.S. Pat. No. 3,737,409 to Fox. For these copolymers, a mole or unit ratio of 1:5 to 5:1, is desirable. The preferred diphenyl sulfone monomer for these resins is bis(3,5-dimethyl-4-hydroxyphenyl)sulfone, also known as dixylenol sulfone, which may be formed from 2,6-xylenol. The other preferred monomer is 2,2-bis(4-hydroxyphenyl)propane, also known as bisphenol A.

The addition polymers which are mixed with the polycarbonate to form the compatible composition are comprised of units derived from repeat groups including a heterogroup. Heterogroups are groups containing atoms besides carbon and hydrogen; such atoms are designated heteroatoms. The term heterogroup also comtemplates the heteroatoms themselves.

The polymers containing heterogroups can have the heterogroups (A) as pendant groups on the polymer chains or as linkages in the polymer chain:

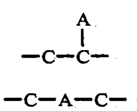

Typical examples of heteroatoms are oxygen, sulfur, nitrogen, halogen, etc. Examples of heterogroups are esters

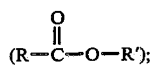

nitrile (R—CN); anhydride

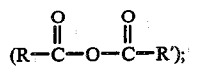

imide

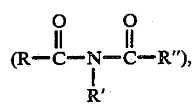

carbonate

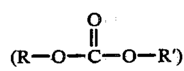

and the like. From the foregoing, it follows that polymers within the scope of this invention, without limitation, are illustrated by styrene resins, alkyl acrylate resins, vinyl halide polymers or combinations thereof.

Once formed, the product composition may be employed (or further processed) in conventional manner. Its applications include, for example, tough films useful in packaging. It may also be injection molded or extruded to produce a variety of useful thermoplastic articles.

In addition to at least two polymeric components, the present compositions may contain any of the conventional additives, for the purposes for which they are known. These additives include fire-retardants, impact modifiers, pigments, tints, reinforcing materials such as glass fiber, antioxidants and the like. They may be combined with the compositions either before or after melt mixing.

Addition polymers suitable for admixing with the polycarbonate are selected from the group consisting of styrene resins, alkyl acrylate resins, vinyl halide polymers, or combinations thereof.

(a) Styrene Resin

Styrene resins suitable for use herein are ABS type polymers, the molecules of which contain two or more polymeric parts of different compositions that are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

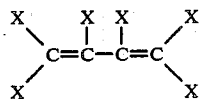

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generically described by the following formula:

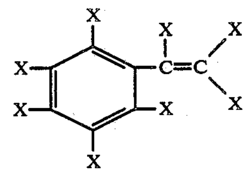

wherein X is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, 4-methylstyrene; 3,5-diethylstyrene, 4-n-propylstyrene, α-methylstyrene, α-methyl vinyltoluene, α-chlorostyrene, α-bromostyrene, dichlorostyrene, dibromostyrene, tetra-chlorostyrene, mixtures thereof, and the like. The preferred monovinylaromatic hydrocarbons used are styrene and/or α-methylstyrene.

A second group of monomers that may be polymerized in the presence of the prepolymerized backbone are acrylic monomers such as acrylonitrile, substituted acrylonitrile, and/or acrylic acid esters, exemplified by acrylonitrile, and alkyl acrylates such as methyl methacrylate.

The acrylonitrile, substituted acrylonitrile, or acrylic acid esters are described generically by the following formula:

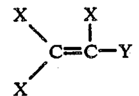

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, and β-bromoacrylonitrile, methyl acrylate, methyl methacrylate, ethyl acrylate, butyl acrylate, propyl acrylate, isopropyl acrylate and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprises from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyrene-acrylonitrile copolymer. Also, there are occasions where a copolymer, such as α-methylstyrene-acrylonitrile, is added to the graft polymer copolymer blend. When a graft is polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

(b) Alkyl Acrylate Resin

The alkyl acrylate resin which may be used herein includes a homopolymer of methyl methacrylate (i.e. polymethyl methacrylate) or a copolymer of methyl methacrylate with a vinyl monomer (e.g. acrylonitrile, N-allylmaleimide, or N-vinyl maleimide), or an alkyl acrylate or methacrylate in which the alkyl group contains from 1 to 8 carbon atoms, such as methyl acrylate, ethyl acrylate, butyl acrylate, ethyl methacrylate and butyl methacrylate. The amount of methyl methacrylate is greater than about 70% by weight of this copolymer resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The methyl methacrylate resins have a reduced viscosity of from 0.1 to about 2.0 dl/g in a one percent chloroform solution at 25° C.

(c) Vinyl Chloride Polymers

The vinyl chloride polymers suitable for use herein are polyvinyl chloride and copolymers of vinyl chloride and copolymers of vinyl chloride with olefinically unsaturated polymerizable compounds which contain at least 80 percent by weight of vinyl chloride incorporated therein.

Olefinically unsaturated compounds which are suitable for copolymerixation include vinylidene halides, such as vinylidene chloride and vinylidene fluoride, vinyl esters, such as vinyl acetate, vinyl propionate, vinyl butyrate, vinyl chloroacetate, vinyl benzoate, acrylate and α-alkyl-acrylate and their alkyl esters, amides and nitriles, methacrylic acid, maleic acid or anhydride, methyl methacrylate, ethyl acrylate, 2-ethyl hexylacrylate, butyl methacrylate, 2-hydroxypropyl acrylate, acrylamide. N-methyl acrylamide, acrylonitrile and methacrylonitrile, aromatic vinyl compounds, such as styrene and vinyl naphthalene and olefinically unsaturated hydrocarbons such as ethylene-bicyclo[2,2,2]-hept-2-ene and bicyclo-[2,2,1]hepta-2,5-diene. Polymerized vinyl acetate may be hydrolyzed to provide vinyl alcohol moieties in the polymer.

These vinyl chloride polymers are well known in the art and can be prepared by the usual methods of solution, emulsion, suspension, bulk or mass polymerization.

Vinyl chloride polymers which have molecular weight of from about 40,000 to about 60,000 are preferred.

The intrinsic viscosities (I.V.) are all determined in a solvent mixture comprising 60–40 w/w phenol-tetrachloroethane at 30° C.

In the Examples which follow, the general procedure for mixing, molding and testing is as follows: The components are melt mixed in an extruder operating under the following conditions:

| | Temperature | | | | | | |
|---|---|---|---|---|---|---|---|
| RPM | ZONE 1 | ZONE 2 | ZONE 3 | ZONE 4 | DIE 2 | DIE 1 | AMP |
| 65 | 400° F. | 425° F. | 425° F. | 440° F. | 450° F. | 450° F. | 10.0 |

The extruded, blended polymer strands are chopped into pellets which are dried and injection-molded (into specimens suitable for testing) in a 3 ounce/75 ton Newbury injection molding machine operating under the following conditions:

Barrel Temperature: 465° F.

Mold Temperature: 150° F.

Molding Pressure: 1500 psi.

The specimens were evaluated for flexural properties (ASTM D790) and heat distortion temperature (ASTM D256).

EXAMPLE 1

A physical mixture of 50 percent by weight of dry polycarbonate having a 1:1 mole ratio of sulfone to bisphenol and 50 percent by weight of ABS resin (manufactured by Borg Warner Clenical under the trademark Cycolac GSM) are extruded blended, injection molded and tested for properties. The results are presented in Table I below.

Comparative Composition A

A physical mixture of 50 percent by weight of dry 2,2-bis(3,5 dimethyl-4-hydroxyphenyl)propane polycarbonate and 50 percent by weight ABS resin (manufactured by Borg Warner Clemical under the trademark Cycolac GSM) are extruded blended, injection molded, and tested for properties. The results are presented in Table I below.

TABLE I

POLYCARBONATE BLENDS WITH ABS

| | Comparative Composition A | Example 1 |
|---|---|---|
| Tg °C. | 109,178 | 147 |
| HDT °C.[a] | 106 | 117 |
| Flex modulus, psi[b] | 374,000 | 405,000 |
| Flex strength, psi | 9,210 | 14,000 |
| Tensile modulus, psi[c] | 376,000 | 381,000 |
| Tensile Strength, psi | 6,710 | 8,200 |

[a]HDT-ASTM D648;
[b]Flexural properties-ASTM D790;
[c]Tensile properties-ASTM D638

In each of the properties listed the bisphenol-A sulfone polycarbonate blend is superior to that of the 2,2-bis(3,5 dimethyl-4-hydroxyphenyl)propane polycarbonate. Indeed, the flexural strength is over 50% higher with the bisphenol-A sulfone polycarbonate.

EXAMPLE 2

A physical mixture of 30 percent by weight of dry polycarbonate having a 1:1 mole ratio of sulfone to bisphenol and 70 percent by weight of Cycolac GSM-ABS resin are extruder blended, injection molded, and tested for properties. The results of this Example are presented in Table II below.

TABLE II

| Property | Example 2 | Cycolac GSM* |
|---|---|---|
| Tg (°C.) | 137 | 124 |
| HDT (°C.) | 103 | 96 |
| Flex. Mod., psi | 428,000 | 260,000 |
| Flex. Str., psi | 12,300 | 8,000 |
| Tensile Mod., psi | 357,000 | 260,000 |
| Tensile Str., psi | 7,200 | 6,300 |

*Control

EXAMPLE 3

A physical mixture of 50 percent by weight of dry polycarbonate having a 1:1 mole ratio of sulfone to bisphenol and 50 percent ABS resin (manufactured by Monsanto Company under the trademark Lustran 461) are extruder blended, injection molded, and tested for properties. The results of this Example are as follows:

| Property | Composition | Lustran 461 |
|---|---|---|
| Tg (°C.) | 126 | 106 |
| HDT (°C.) | 105 | 89 |
| Flex. Mod., psi | 432,000 | 420,000 |
| Flex. Str., psi | 12,800 | 10,000 |
| Tensile Mod., psi | 420,000 | 340,000 |
| Tensile Str., psi | 7,300 | 6,000 |

EXAMPLE 4

A physical mixture of 50 percent by weight of dry polycarbonate having a 1:1 mole ratio of sulfone to bisphenol and 50 percent by weight of SAN-poly(-styreneacrylonitrile) containing about 28% acrylonitrile are extruder blended, injection molded, and tested for properties. Comparative results are as follows:

| Property | Composition | SAN |
|---|---|---|
| Tg (°C.) | 128 | 107 |
| HDT (°C.) | 110 | 86 |
| Flex. Mod., psi | 490,000 | 396,000 |
| Flex. Str., psi | 14,000 | 15,900 |

EXAMPLE 5

A physical mixture of 20 percent by weight of dry polycarbonate having a 1:1 mole ratio of sulfone to bisphenol and 80 percent by weight of SAN are extruder blended, injection molded, and tested for properties. Comparative results are as follows:

| | Composition | SAN |
|---|---|---|
| HDT (°C.) | 91 | 107 |
| Flex. Mod., psi | 520,000 | 396,000 |
| Flex. Str., psi | 16,300 | 15,900 |

EXAMPLE 6

A physical mixture of 80 percent by weight of dry polycarbonate having a 1:1 mole ratio of sulfone to bisphenol and 20 percent by weight of SAN are extruder blended, injection molded, and tested for properties. Comparative results are as follows:

| | Composition | SAN |
|---|---|---|
| HDT (°C.) | 140 | 107 |
| Flex. Mod., psi | 455,000 | 396,000 |
| Flex. Strength, psi | 12,400 | 15,000 |

EXAMPLE 7

A physical mixture of 40 percent by weight of dry polycarbonate having a 1:1 mole ratio of sulfone to bisphenol, 40 percent by weight polymethylmethacrylate, and 20 percent by weight of poly(ethylene terephthalate) are extruder blended, injection molded, and tested for properties substantially as described in Example 22. The results are described below:

| | |
|---|---|
| HDT, °C. | 101 |
| Flex. Mod., psi | 327,000 |
| Flex. Str., psi | 12,000 |

EXAMPLE 8

A physical mixture of 26 percent by weight of dry polycarbonate having a 1:1 mole ratio of sulfone to bisphenol, 35 percent by weight of polyvinylchloride, 26 percent by weight of poly(ethylene terephthalate) and 10 percent by weight of an acrylate based polymer called KM-611 (sold by Rohm and Haas) are melt mixed, compression molded and tested for properties. The results are described below.

| | |
|---|---|
| Flex. Mod., psi | 330,000 |
| Flex. Str., psi | 8,900 |
| Notched Izod ft-lbs/in | 2.2 |

Polymer Synthesis

The dixylenol sulfone/bisphenol A (DXS/BPA) described in the foregoing examples were prepared employing interfacial polymerization, in which a rapidly stirred two phase mixture of aqueous caustic, polymer solvent, bisphenols, a phase transfer catalyst, and monofunctional chain terminators is phosgenated. The growing polymer dissolves in polymer solvent, unreacted bisphenols dissolve in the aqueous caustic phase and the polymer forms at the interface. The polymer is isolated by precipitation in methanol and dried. The applicable technology of the synthesis of polycarbonates is described in "Chemistry and Physics of Polycarbonates" by H. Schnell (Interscience, 1964).

Preferred blends are admixtures of a polycarbonate resin including units derived from a first dihydric phenol, which is a bis(hydroxyaryl)sulfone and a second dihydric phenol, and a thermoplastic which is the resin product of a condensation polymerization reaction. These resin products would include vinyl addition polymers containing hetero groups.

All of the foregoing patents and/or publications are incorporated herein by reference. Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A thermoplastic resin composition comprising:

(a) a mixed polycarbonate comprising units derived from a first dihydric phenol, which is a bis(hydroxyaryl)sulfone, and a second dihydric phenol said first and second dihydric phenols in a mole ratio of about 1:5 to 5:1; and (b) one or more thermoplastic addition polymers containing hetero groups, selected from alkyl acrylate resins, vinyl chloride polymers, or combinations thereof, said composition having been admixed to produce a compatible composition.

2. A composition as defined in claim 1, wherein the thermoplastic addition polymer resin is an alkyl acrylate polymer resin.

3. A composition as defined in claim 2, wherein the alkyl acrylate is poly(methyl methacrylate).

4. A composition as defined in claim 2, wherein the alkyl acrylate is a copolymer of methylmethacrylate and a vinyl monomer wherein the amount of methyl methacrylate is greater than about 70 percent by weight of the copolymer.

5. A composition as defined in claim 1, wherein the thermoplastic addition polymer resin is a poly(vinyl chloride).

6. A composition as defined in claim 5, wherein the poly(vinyl chloride)polymer is a copolymer of vinyl chloride with an olefinically unsaturated polymerizable compound which contains at least about 80 percent by weight of vinyl chloride incorporated therein.

7. The composition of claim 1, wherein the polycarbonate comprises from about 1 to about 99 percent by weight of total resin weight.

8. The composition of claim 7, wherein the polycarbonate comprises from about 10 to about 90 percent by weight of total resin weight.

9. The composition of claim 7, wherein the polycarbonate comprises from about 20 to about 80 percent by weight of total resin weight.

10. The composition of claim 7, wherein the thermoplastic addition polymer comprises from about 80 to about 20 percent by weight of the total resin weight.

11. The composition of claim 7, wherein the addition polymer comprises from about 90 to about 10 percent by weight of total resin weight.

12. The composition of claim 9, wherein the thermoplastic addition polymer comprises from about 80 to about 20 percent by weight of the total resin weight.

13. The composition of claim 1, wherein the polycarbonate comprises units derived from bis(3,5-dimethyl-4-hydroxyphenyl)sulfone.

14. The composition of claim 13, wherein the polycarbonate also comprises units derived from 2,2'-bis(4-hydroxyphenyl)propane.

15. The composition of claim 14, wherein the bis(3,5-dimethyl-4-hydroxyphenyl)sulfone and the 2,2'-bis(4-hydroxyphenyl)propane units are in a mole ratio of from about 1:99 to about 99:1.

16. The composition of claim 1, wherein the polycarbonate comprises units of 2,2'-bis(4-hydroxyphenyl)-propane.

17. A composition as defined in claim 1, wherein the thermoplastic addition polymer resin is a mixture of an alkyl acrylate polymer resin and a poly(vinyl chloride).

18. A composition as defined in claim 17, wherein the thermoplastic addition polymer is a mixture of polymethylmethacrylate and poly(ethylene terephthalate).

19. A composition as defined in claim 17, wherein said vinyl chloride polymer is a mixture of poly(ethylene terephthalate) and polyvinylchloride.

20. A composition as defined in claim 18, wherein the polycarbonate:polymethylmethacrylate:poly(ethylene terephthalate) ratio by weight is approximately 40:40:20 percent.

* * * * *